United States Patent [19]
Turner

[11] 3,797,211
[45] Mar. 19, 1974

[54] MOWERS

[75] Inventor: Anthony Leonard Turner, Alcester, England

[73] Assignee: Turner Engineering Company (Coughton) Limited, Coughton, near Alcester, Warwick, England

[22] Filed: June 13, 1972

[21] Appl. No.: 262,328

[52] U.S. Cl.................... 56/15.6, 56/11.9, 56/15.8, 56/16.2
[51] Int. Cl............................................. A01d 35/00
[58] Field of Search.......... 56/6, 7, 11.9, 12.6, 14.9, 56/15.6, 15.7, 15.8, 16.2

[56] References Cited
UNITED STATES PATENTS

| | | | |
|---|---|---|---|
| 2,827,746 | 3/1958 | Bouillant-Linet................ | 56/15.8 X |
| 3,646,733 | 3/1972 | Clapsaddle...................... | 56/16.2 X |
| 2,976,663 | 3/1961 | Smith et al...................... | 56/15.8 X |
| 3,127,940 | 4/1964 | Hutchinson et al.............. | 56/15.8 X |
| 3,641,748 | 2/1972 | Vose................................ | 56/16.2 X |

*Primary Examiner*—Louis G. Mancene
*Assistant Examiner*—I. A. Oliff
*Attorney, Agent, or Firm*—Marshall & Yeasting

[57] ABSTRACT

A self-contained hydraulically operated mower assembly for detachable mounting on a tractor comprises a body which forms a hydraulic reservoir and which is provided with means for releasably mounting the body on the rear end of a tractor. A shaft has one end rotatably mounted on said body, and the other end is rotatably and releasably supported on a tractor forward of said body. A laterally-extending arm is fixed to said shaft adjacent to said other end of the shaft, and a cutter is pivoted to the arm for pivotal movement about an axis parallel to the shaft. A hydraulic motor drives the cutter, a first hydraulic ram maintains the shaft in a selected angular position relative to said body, and a second hydraulic ram maintains the cutter in a selected angular position relative to the arm.

3 Claims, 5 Drawing Figures

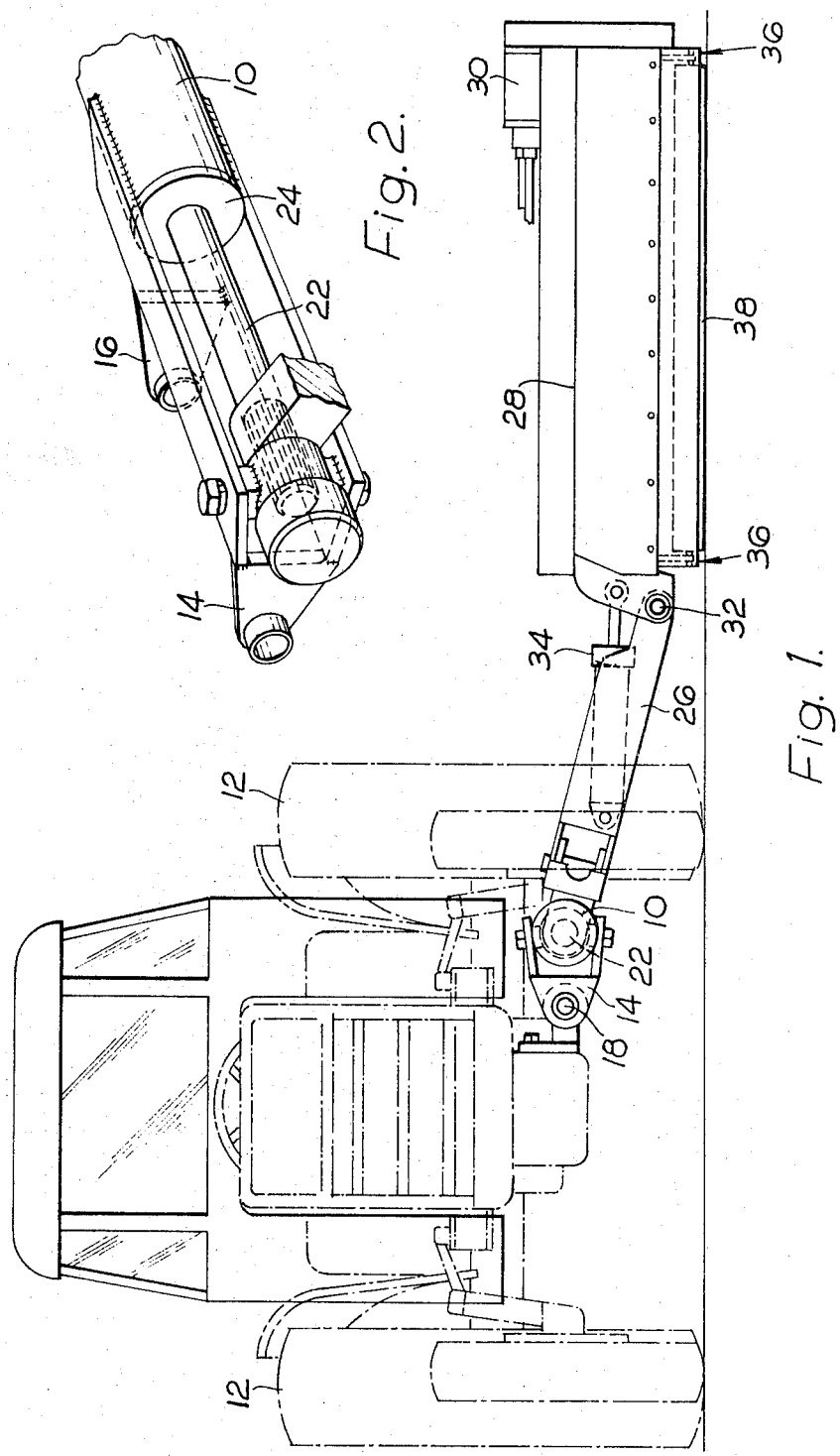

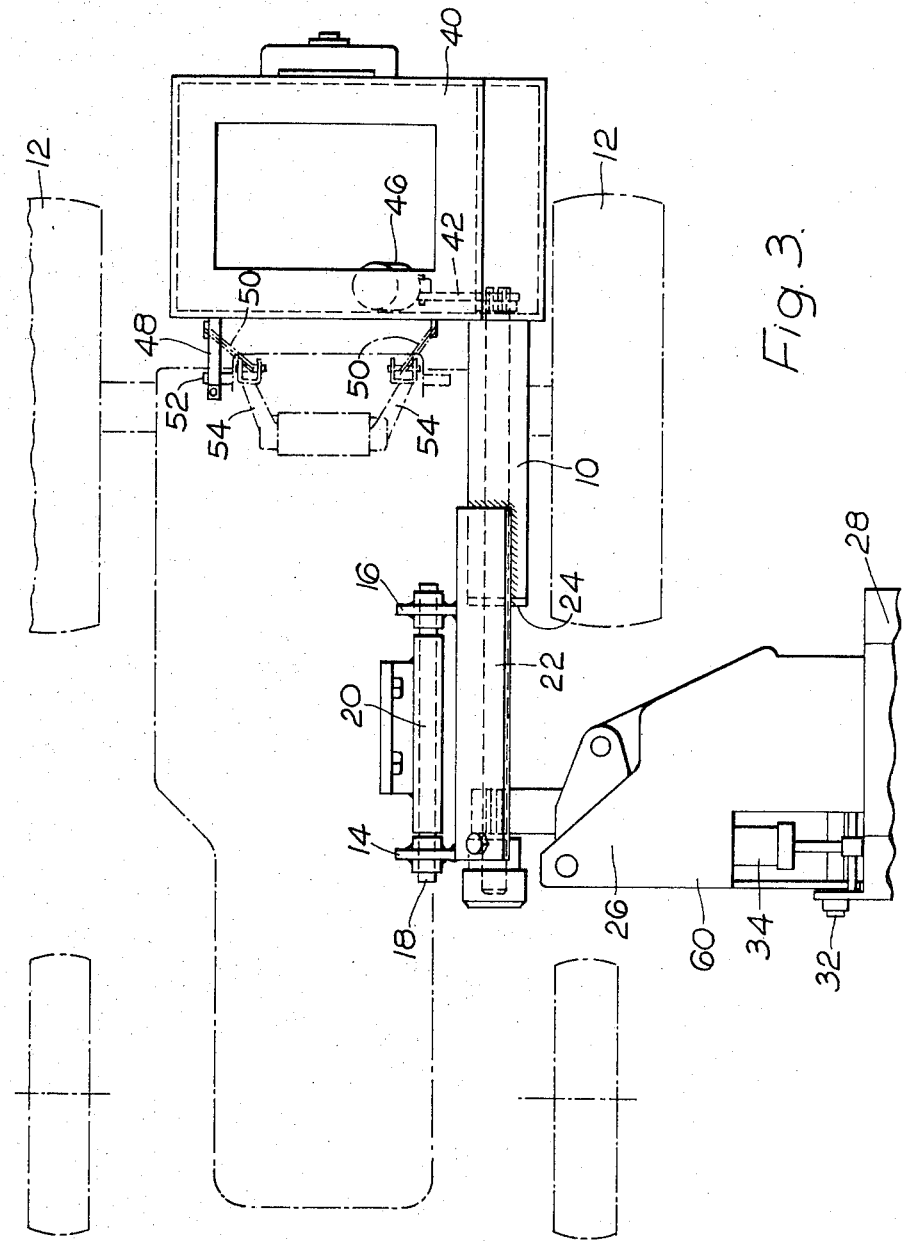

MOWERS

BACKGROUND OF THE INVENTION

This invention relates to mowers of the kind used for cutting road-side vegetation. This is a seasonal task and the tractors are required to perform other duties at the same and other seasons, and it is therefore desirable that the mower shall be easily and quickly connected to and detached from the tractor.

This has been done in the past by mounting the mower unit at the rear of a tractor and supporting it upon the conventional lift arms provided at the rear of the tractor, but this has two disadvantages; firstly it sometimes necessitates weights at the front end of the tractor to restore the balance, and if not the steering is very light and uncertain; secondly, when the mowing is carried out it is necessary for the driver to steer the tractor along the road, whilst devoting a portion of his attention to observing the operation of the mower head, (the actual cutting portion of the unit) and the tractor must go very slowly and even then some difficulty and even danger is involved. For these reasons, it has been preferred to mount the mower midway along the length of the tractor and laterally of the tractor, so that the mower head is substantially opposite the driver. When the tractor is fitted with a cab, as is now required for safety purposes, such a midway position may prevent free access of the driver to and from the cab, at least on one side of the tractor if not both, or removal and re-attachment of the mower unit may necessitate removal and re-attachment of the cab, which involves complications and waste of time.

SUMMARY OF THE INVENTION

The objects of the invention are to provide a mower unit which may be quickly and easily connected to a tractor and removed from the tractor, which is mid-mounted on the tractor, and which does not impede normal use of the tractor cab.

In accordance with the present invention, a mower unit comprises a mower head mounted on one or more arms which are supported by one end of a shaft adapted to be detachably connected to the tractor at a mid-position thereon, and so that the arm and head extend laterally thereof, the opposite end of the shaft being connected to a unit structure comprising hydraulic oil reservoir, pump, and controls for energising the head and varying its position, which is adapted to be mounted on the rear of the tractor.

By these means, the weight is distributed about the tractor so that front weights or balance weights are unnecessary, and connection to and disconnection from the tractor may be simplified as will be better understood from a consideration of the following description.

BRIEF DESCRIPTION OF THE DRAWINGS

FIG. 1 is a front elevation of a tractor (shown in chain-dot lines) and fitted with the mower unit;

FIG. 2 is a fragmentary perspective view showing the front coupling between mower and tractor;

FIG. 3 is a fragmentary plan view of the whole;

DESCRIPTION OF THE PREFERRED EMBODIMENT

Figure 4:
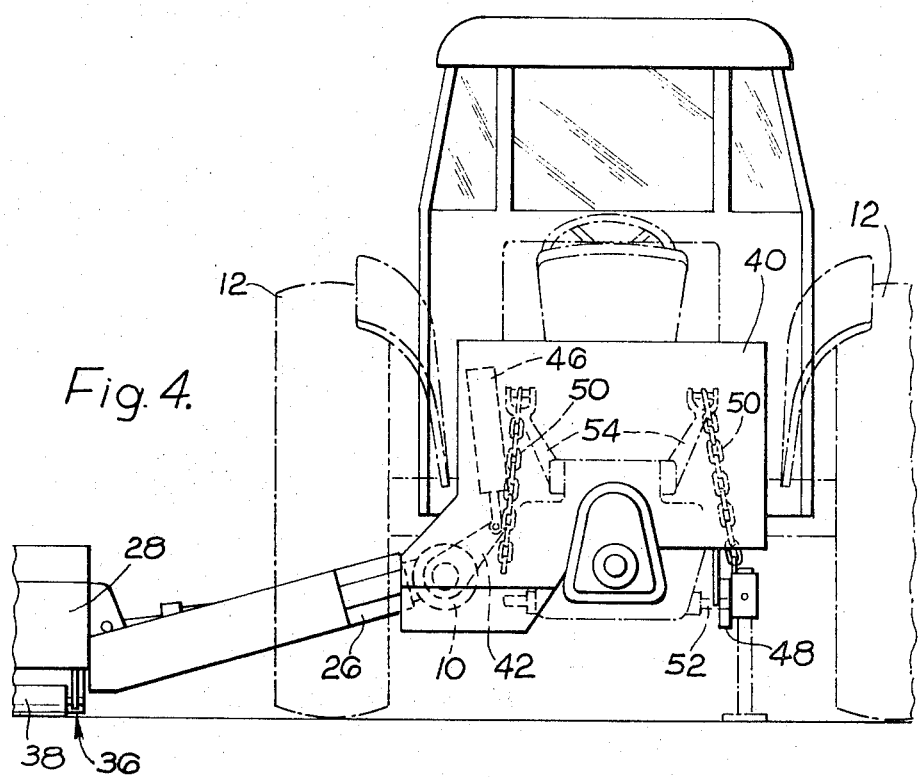
FIG. 4 is a fragmentary rear elevation.
Figure 5:
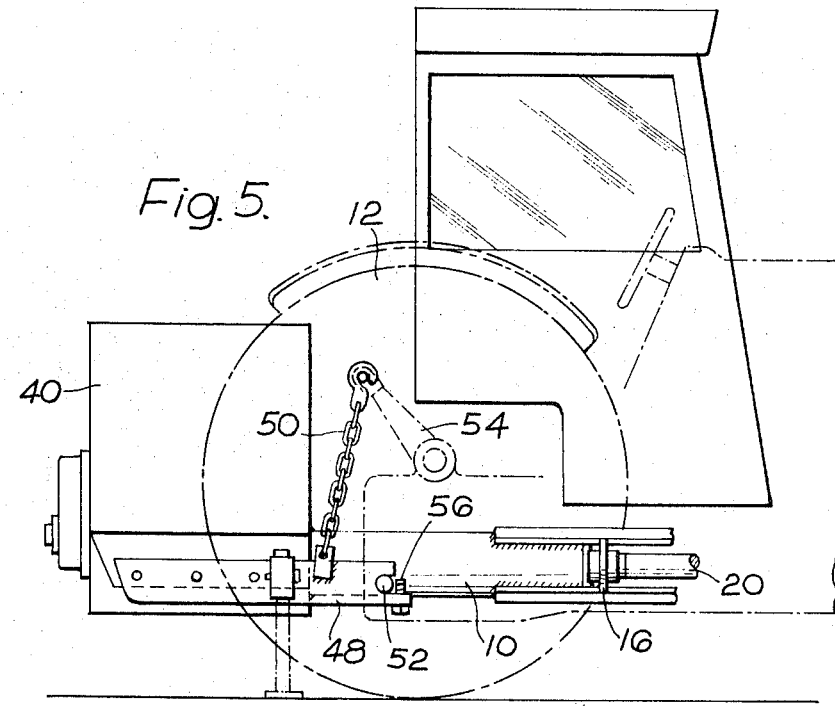
FIG. 5 is a fragmentary elevation showing a rear coupling.

Referring now to the drawings, a relatively large diameter tube 10 is provided for extending from the region of the rear wheels 12 of the tractor to a mid-point along the length thereof, the tube (when mounted on the tractor, extending below the body of the tractor). The front end of the tube, see FIG. 2, is provided with a pair of lugs 14, 16, and is coupled to the tractor by a pin 18 extending through those lugs 20 already provided on the tractor. This provides a mounting for the tube so that it may swing to take its axis in an arc about the axis of the pin.

The tube houses a torsion bar 22 which extends along the length of the tube and projects beyond the front end of the tube, through a journal bearing and oil seal 24 in the end of the tube. The torsion bar is splined at its end and carries a first arm 26 which extends laterally of the tractor and away from the tractor. The arm thus extends radially and is adapted to swing about the axis of the tube and hence the torsion bar so that its free end remote from the tractor moves in an arc having upward or downward components.

A mower head comprises an elongated casing 28 open at its lower side journalling a shaft (not shown) extending along the length of the casing, and the shaft carrying sets of flail blades or rotary or other cutting means. The shaft is driven by a hydraulic motor 30 located for example at one end of the casing which is most remote from the tractor. The opposite end of the casing is journalled on a cross pin 32 to the free end of the arm 26, and a hydraulic ram 34 extends between the arm and the casing, so that in lengthening or shortening of the ram by suitable application of hydraulic pressure, the casing and hence the complete mower head are swung about the axis of the cross pin. Hence by suitable positioning of the arm and the casing, the mower may operate upon a level surface which is higher or lower than the road upon which the tractor rests, or upon a surface inclined upwardly or downwardly away from the road.

Ends of the casing are provided with ground engaging skids 36, and the casing is also provided with a trailing roller 38 for ground engagement.

The rear of the tube 10 is fast with a tank structure 40 carried at the rear of the tractor. The tube may open into the tank, which forms a reservoir for hydraulic fluid, so that the tube itself forms an extension of the tank and an extension of the reservoir and the surface area of the tube may provide a useful additional cooling effect for the hydraulic fluid or the tube may be remote from the tank. The torsion bar is journalled in the tank, and at its rear end is fast, for example by means of splines, with a radially extending crank arm 42, see FIG. 4, which is pinned to one end of the ram of a hydraulic cylinder 46 extending upwardly in the tank.

Application of hydraulic fluid to one or other end of this ram turns the crank and hence turns the torsion bar so as to swing the arm 26 in the manner mentioned. The tank carries a gear box (not shown) which is provided with a connection point for coupling to the power-take-off shaft (also not shown) of the tractor, so as to drive a pump within the tank, and hydraulic controls for the mower driving motor and for the rams may also be located in the tank so that they are all enclosed and shielded from dirt. The controls may be connected to hand-operated levers located near the driver.

The tank is provided with a pair of bifurcated lugs 48 extending forwardly of the tank, and with a chain or pair of chains 50.

Tractors of the kind used for these mowing purposes are usually provided with hydraulically operated lift arms at the rear, these comprising a pair of arms journalled near the rear-axle centre and the arms may be removed leaving short pins 52 on which the bifurcated ends may engage. The chains may be engaged with the top arms 54 provided above the arms referred to, so that by raising those arms, the complete tank unit is lifted into the position for use. A bolt, cotter pin or the like 56 may be inserted through the free end of each of the bifurcated portions to secure them to the pins.

The arm which is fast with the forward end of the torsion bar may be provided with ramp portions 60 which, when in the position for use extend for and aft. The unit of tank and associated parts together with tube and arm and mower may be laid flat upon the graound and the tractor reversed so that one rear wheel rides up one of the ramps 60, across the arm and down the other of the ramps until in the approximately correct position for engagement. The tank is coupled to the lift arms of the tractor by the method explained hereinbefore. The front end of the tube may then be coupled to the tractor by means of the single pin.

When the mower is connected to the tractor, the tank ram may be extended (or contracted as the case may be) to swing the arm upwardly as far as possible, and the arm to head ram may be contracted (or expanded as the case may be) to swing the mower head to a near vertical position parallel to the side of the tractor,for convenience in movement of the tractor to a position for use. In the position for use the arm and mower head are lowered until the mower head is resting upon for example a grass verge to be mown, and the hydraulic ram movement necessary for this may be continued so that the mower head rests firmly on the ground and is supported by the trailing roller and the skids. The tractor is then driven along the road parallel to the verge whilst the head motor is driven to rotate the shaft and flail-mow the verge. In the event of any variation in the contour of the ground the mower unit may rise or fall, accompanied by deflections in the torsion bar, accommodated in part by the pivotal connection provided at the front end of the tube. It is found that variations of the order of several inches or even one foot (depending upon the design parameters) above and below a mean position may be accommodated by these means. This simplifies use and enables the driver to concentrate more on driving the tractor, giving less attention to repositioning of the mower head.

The foregoing description relates to a mower provided with a single arm located between the mower head and the tractor. Similar principles may be applied to an arrangement having two arms located between the mower unit and the tractor, in which case one ram will control the position of the second arm relative to the first arm, and a second ram the position of the mower head relative to the second arm. In this event however the range of loads applied to the torsion bar may vary by such a magnitude, depending upon whether the two arms are substantially colinear or are parallel, that additional torsional or otherwise suspension means may be required.

One possibility is to provide a torque tube located within the main tube and fast with the free end of the latter, extending towards the tank structure, the torsion bar itself passing through the two tubes. The torsion bar is then provided with a radial lug or lugs, and the torsion tube likewise, so that when the torsion bar is turned by the ram from the vertical position towards a position in which the first arm extends substantially horizontally, then the lugs engage, and a downwards movement of the free end of the first arm (that is the end remote from the tractor) will result in torsional load being taken via the tube as well as by the shaft.

Alternatively, a rotational damper may be located parallel to the shaft and adjacent the first arm, and have a radially extending lever together with a roller abutment, arranged so that when the first arm is moved from for example a near vertical position towards a near horizontal position it encounters the radial lever and turns the latter, meeting resistance from the damper, so that the latter shares torsional leads.

In the illustrated arrangement, the main tube runs below the cab and its attachment points, and the tank is behind the cab, so that the mower unit can be detached and re-connected without disturbing the cab, and vice versa.

Another arrangement which is possible within the scope of the invention is to utilise a construction generally similar to that illustrated but to locate the hydraulic ram for varying the arm position along the length of the arms, i.e. at the forward end of the torsion bar or tube instead of at the rearward end of the same. This may be preferred when the arms have a long reach and the torsion bar or tube then continues to serve in transferring load to the rear axle of the tractor and possibly also as a resilient means controlling the cutting head in any adjusted position, although other means may be provided for the latter purpose.

I claim:

1. A self-contained hydraulically operated mower assembly for detachable mounting on a tractor, comprising a body which forms a hydraulic reservoir and which is provided with means for releasably mounting the body on the rear end of a tractor, a shaft which has one end rotatably mounted on said body, means for rotatably and releasably supporting the other end of the shaft on a tractor forward of said body, a laterally-extending arm fixed to said shaft adjacent to said other end of the shaft, a cutter pivoted to the arm for pivotal movement about an axis parallel to the shaft, a hydraulic motor for driving the cutter, a first hydraulic ram for maintaining the shaft in a selected angular position relative to said body, and a second hydraulic ram for maintaining the cutter in a selected angular position relative to the arm.

2. An assembly according to claim 1 wherein the first hydraulic ram is disposed within said reservoir and has a driving connection with a crank which is also disposed within the reservoir and is fixed to the shaft.

3. An assembly according to claim 1 wherein the means for releasably mounting the body on the rear end of a tractor comprises means for suspending the body from lift arms of the tractor.

* * * * *